United States Patent [19]
Akao et al.

[11] Patent Number: 5,794,777
[45] Date of Patent: Aug. 18, 1998

[54] CONTAINER WITH LIGHT-SHIELDING MEMBER FOR WEB-SHAPED PHOTOSENSITIVE MATERIAL

[75] Inventors: Mutsuo Akao; Tetsuo Nishimura, both of Minami-ashigara; Kenji Sashihara, Odawara, all of Japan

[73] Assignee: Fuji Photo Film Co., Ltd., Kanagawa-ken, Japan

[21] Appl. No.: 758,457

[22] Filed: Nov. 29, 1996

[30] Foreign Application Priority Data

Nov. 29, 1995 [JP] Japan ............................. 7-335934

[51] Int. Cl.⁶ .................................................. B65D 85/67
[52] U.S. Cl. ........................... 206/409; 206/455; 242/68.7
[58] Field of Search ............................... 206/389, 409, 206/395, 455, 316.1; 428/96; 242/71.1, 68.7

[56] References Cited

U.S. PATENT DOCUMENTS

| | | |
|---|---|---|
| 4,730,778 | 3/1988 | Akao et al. .................. 242/68.7 |
| 4,787,506 | 11/1988 | Akao ............................... 206/395 |
| 5,271,983 | 12/1993 | Ise et al. ...................... 206/389 X |
| 5,275,283 | 1/1994 | Akao . |

FOREIGN PATENT DOCUMENTS

| | | |
|---|---|---|
| 63-49756 | 3/1988 | Japan . |
| 2-72348 | 3/1990 | Japan . |
| 4-23237 | 5/1992 | Japan . |
| 6-10748 | 2/1994 | Japan . |

OTHER PUBLICATIONS

Kagakubinran Ouyo–hen revised 3rd Ed. pp. 996–1008 (1980).

*Primary Examiner*—Bryon P. Gehman
*Attorney, Agent, or Firm*—Sughrue, Mion, Zinn, Macpeak & Seas, PLLC

[57] ABSTRACT

A container for a web-shaped photosensitive material having a core on which is placed the web-shaped photosensitive material in the form of a roll, a port opening via which the web-shaped photosensitive material is taken out, and light-shielding plushes disposed at the port opening. The light-shielding plush is dyed with a colorant dye having spectral absorption (SQ value) in at least a region of spectral photosensitivity of a red-sensitive layer of the web-shaped photosensitive material. Light fog is prevented.

19 Claims, 10 Drawing Sheets

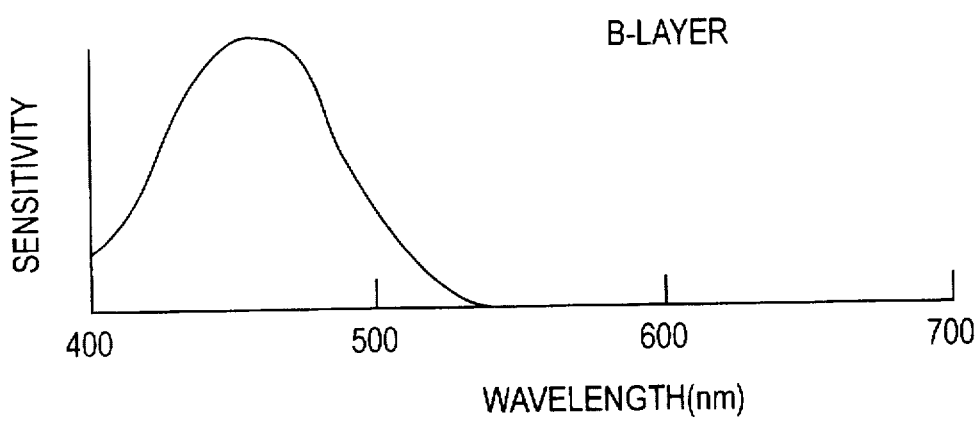
FIG. 4A  B-LAYER
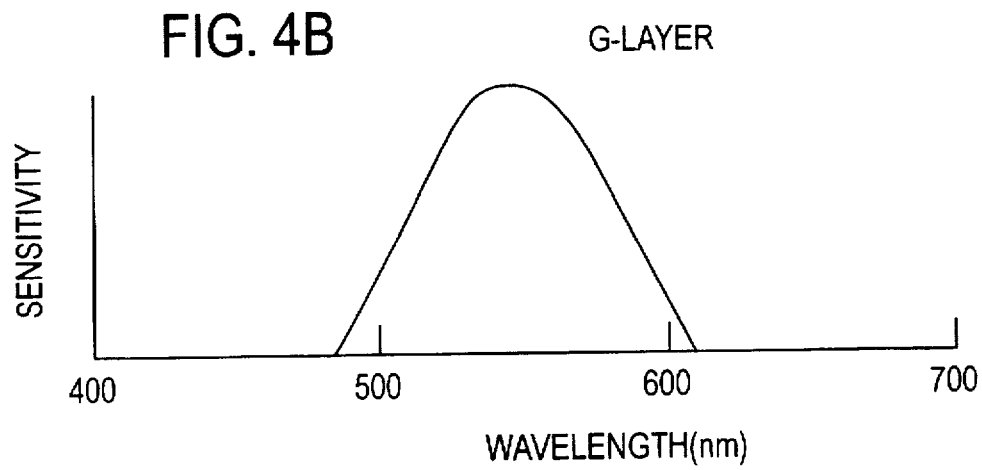
FIG. 4B  G-LAYER
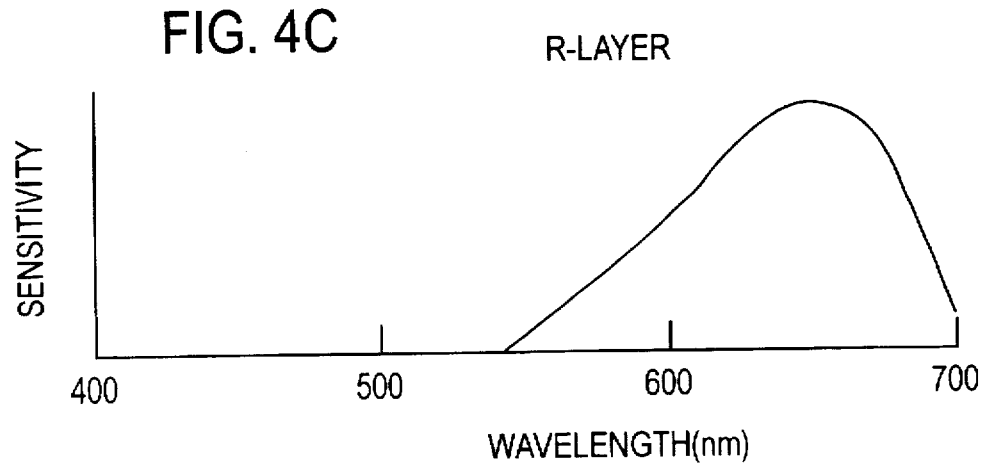
FIG. 4C  R-LAYER

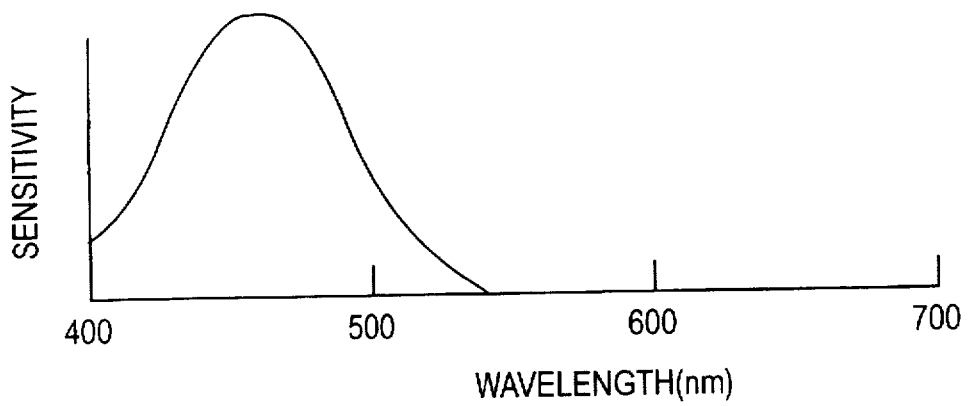
FIG. 5A  B-LAYER
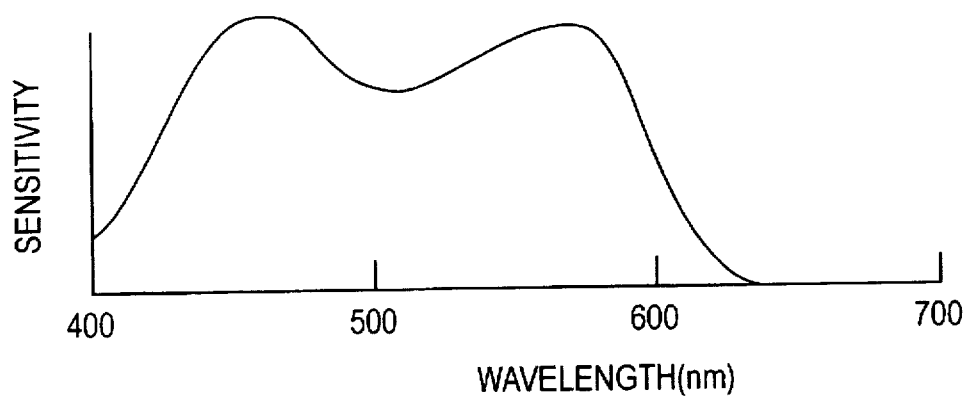
FIG. 5B  G-LAYER
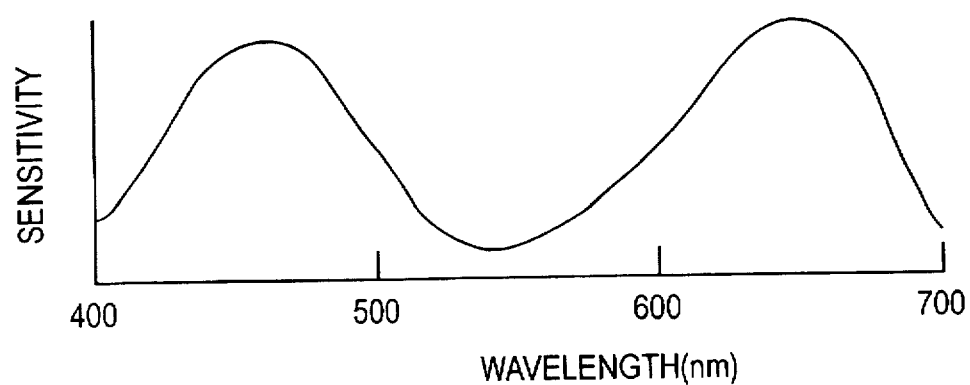
FIG. 5C  R-LAYER

LIGHT INTRUDED FROM PORT OPENING

CONTAINER WITH LIGHT-SHIELDING MEMBER FOR WEB-SHAPED PHOTOSENSITIVE MATERIAL

FIELD OF THE INVENTION

This invention relates to packaging for a photographic paper, particularly in the form of a roll or a web-shaped photosensitive material such as a photographic film. More particularly, it relates to a container for a web-shaped photosensitive material having a light-shielding member in a draw-out opening (port opening) for preventing light fog from being generated when loading the web-shaped photosensitive material under sunlight or in a room illuminating light.

BACKGROUND

At a draw-out opening (port opening) formed in a light-shielding container for drawing out a web-shaped photosensitive material, such as a photographic film patrone of JIS 135 size or a color photographic paper, it is most likely that light is introduced to produce fog in the web-shaped photosensitive material. A variety of light shielding means have so far been used for the draw-out opening (port opening). The following techniques have been used for improving light shielding characteristics by selection and coloring of the materials of the light-shielding member.

First, there is known a technique of providing a light-shielding plush having colored piles at the draw-out opening of the light shielding container. Although there is no particular limitation to the color of the pile, black color is thought to be preferred for assuring light shielding properties (JP Utility Model Kokoku JP-B-4-23237). Using this technique, a light-shielding member, typically a light-shielding plush having colored piles, is provided at a port opening of, for example, a JIS 135 size photographic film patrone, formed in metal or plastics, for preventing fog of the photographic film due to the light. In this case, a light-shielding plush, having piles colored in black thought to exhibit maximum light shielding properties, has been used.

There is also known a technique in which, in a photographic film magazine in which a light-shielding member having piles is bonded at a photographic film entrance/exit opening, the light shielding member is treated with an anti-static agent based on phosphoric acid compounds and a lubricant (JP Patent Kokoku JP-B-6-10748).

There is also known such a light-shielding container having a core around which a web-shaped photosensitive material is placed in the form of a roll, a draw-out opening via which the web-shaped photographic material is drawn out, and a light-shielding plush provided at the draw-out opening, in which a sealing adhesive layer formed of a polyolefin copolymer composed of fused resin is provided on a base fabric of the light shielding plush (JP Patent Kokai JP-A-63-49756).

There is also known a photographic magazine in which a light-shielding woven fabric having piles and a sealing resin coating on the inner side of a photographic film entrance/exit opening, with thickness errors in the light-shielding woven fabric being set to not larger than 30% (JP Patent Kokai JP-A2-72348).

SUMMARY OF THE DISCLOSURE

According to the investigation behind the present invention, however, the related art has problems as set forth hereinbelow.

Namely, it is difficult to achieve perfect light shielding performance solely by selection of the material types of the light shielding members. This is evident from the fact that, if the light shielding member is not dyed, light fog is produced in the photographic film roll up to the fourth and fifth turns. In JP Utility Model JP-B-4-23237, the piles are colored with a black dye. In this case, a higher light shielding effect may be achieved than in the case of a non-colored light shielding member. However, our investigations have revealed that, if the light shielding member is dyed in black using only the black-colored dye, it is difficult to completely inhibit the light fog if the light shielding material is used in a light-shielding container containing a photographic photosensitive material having an ISO sensitivity of the photosensitive material of not less than-400, such as that having the ISO sensitivity of 400, 600, 800, 1000, 1600 and 3200. That is, light intruded at the port opening enters the reverse side of the photographic film to produce light fog. Granting that the light-shielding plush is apparently formed by piles dyed in black, a photographic photosensitive material, such as a color negative photographic film, a microfilm, color photographic paper, film for lithographical process, film and printing paper for photocomposition, containing sensitizing dyes in the R-layer and/or in the B-layer thereof, in particular a color negative photographic film having the ISO sensitivity of not less than 400, light fog is produced in the R-layer, because the light-shielding member colored in a black dye absorbs light in the long wavelength range to a lesser extent than the light in the short wavelength range.

It is therefore an object of the present invention to provide a container for a web-shaped photosensitive material in a draw-out opening of which is provided a light shielding member designed for absolutely prohibiting the light fog from being produced in a photosensitive material, such as a color negative photographic film, a microfilm, color photographic paper, film for lithographical process, or for film or printing paper for photocomposition.

It is another object of the present invention to provide a shielding member for use in a container for photosensitive materials.

Still further objects and advantages will become apparent in the entire disclosure.

The present invention provides a container for a web-shaped photosensitive material in which the light shielding member constituting a container for a web-shaped photosensitive material is colored in a coloring dye having a spectral absorption (SQ value) in at least the spectral sensitivity region of the R-layer of the web-shaped photographic photosensitive material. Specifically, by using a dye (or dyes) having superior spectral absorption (SQ value) in the spectral sensitivity region of the web-shaped photographic photosensitive material, it becomes possible to completely prevent deterioration in quality of the web-shaped photographic photosensitive material due to fog in the container for the web-shaped photosensitive material.

Now, basic concepts of the present invention will be explained with reference to the drawings.

BRIEF DESCRIPTION OF THE DRAWINGS

FIGS. 4A, 4B and 4C are graphs showing the relations between the light wavelength in the color negative photographic film exposed from the emulsion surface and photosensitivity of the B-layer, the G-layer, and the R-layer, respectively.

FIGS. 5A, 5B and 5C show the relations between the wavelength of the light introduced via a port opening of a film patrone housing a color negative photographic film according to an embodiment of the present invention (the light intruded from the back side of the photographic film) and photosensitivity of the B-layer, the G-layer, and the R-layer, respectively.

BASIC EMBODIMENTS

Figure 1:
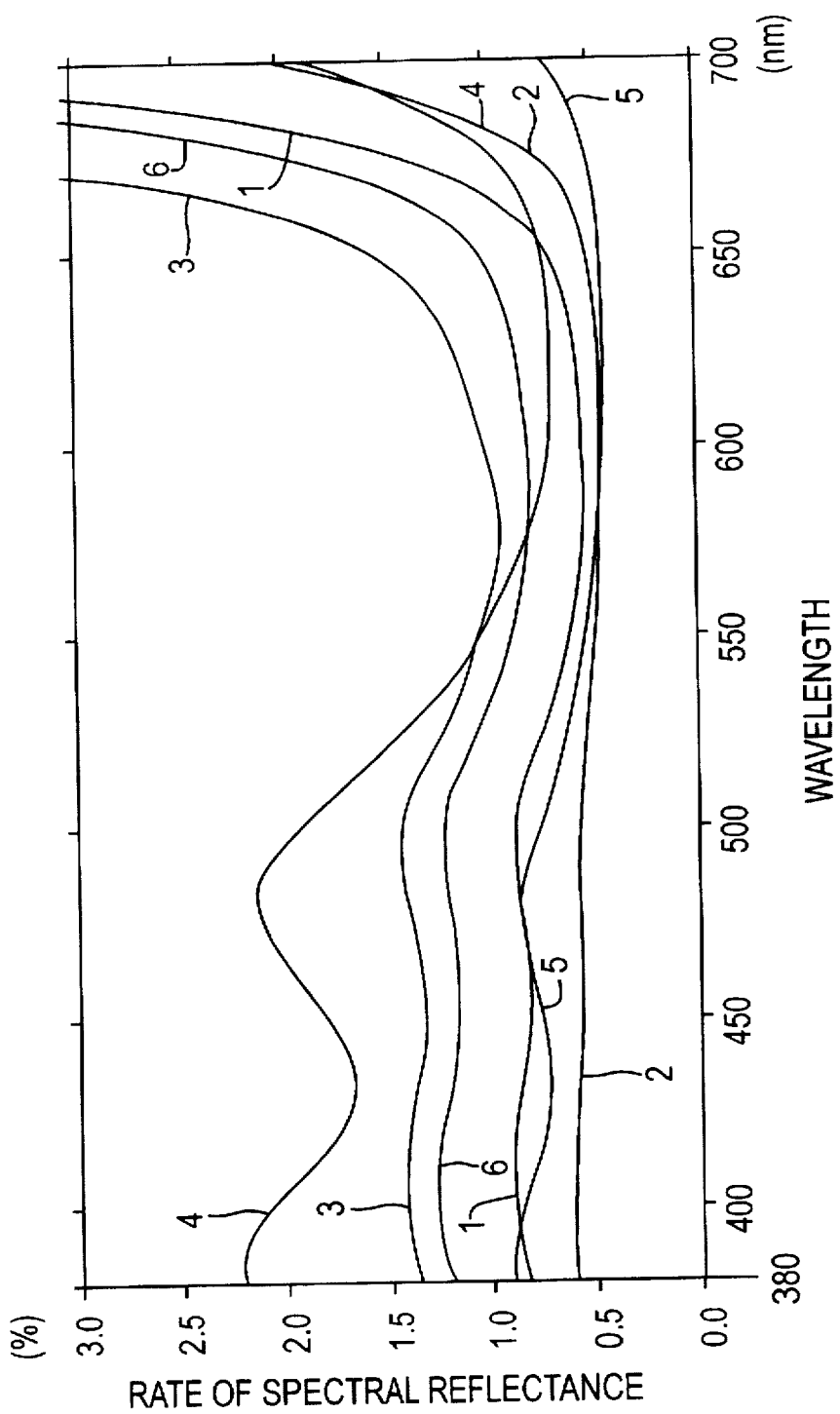
FIG. 1 is a graph showing spectral reflection spectra of light-shielding plushes dyed with several different back dyes, wherein encircled curves denote reflection spectra of the light-shielding plushes dyed with black dyes bearing the same numbers as those shown in Table 1.

Table 1 shows the relation between respective light-shielding plushes dyed with various dyes, SQ values and the light fog density of the R-layer of the color negative photographic film in case measurements made of full-reflection spectral reflectance of a light-shielding plush dyed with a black dye for nylon by a self-recording spectrophotometer (U-4000 type manufactured by HITACHI SEISAKUSHO CO. LTD). FIG. 1 shows the spectral reflection spectrum of each light shielding plush. The SQ value means an integrated value of light absorption of the respective wavelength regions. The higher the integrated values, the higher is the light absorption by a wavelength region under consideration and hence the lesser is the extent of generation of light. fog in the photosensitive material. For example, a SQ value (300 to 400) represents an integrated value of light absorption of the light of 300 to 400 nm. The spectral reflection spectrum specifies that a light-shielding plush (which is at a lower position in FIG. 1) absorbs light sufficiently to prevent light fog of the photosensitive material.

TABLE 1

| Sample No. | Dyes and Density | SQ value (380–680 nm) | SQ value (380–495 nm) | SQ value (495–585 nm) | SQ value (558–680 nm) | Light Fog Density of R-Layer |
|---|---|---|---|---|---|---|
| 1 | Nylon Black SGL (Mitsui*) 5% | 637.03 | 236.96 | 195.12 | 204.95 | 0.78 |
| 2 | Nylon Black SGL (Mitsui*) 14% | 678.49 | 255.48 | 206.28 | 216.73 | 0.55 |
| 3 | Opal Black BNH (Hodogaya*) 5% | 563.22 | 213.29 | 174.93 | 175.00 | 1.42 |
| 4 | Aminyl Black F-VGL (Sumitomo*) 1.5% | 571.66 | 196.94 | 172.69 | 202.03 | 1.16 |
| 5 | Aminyl Black F-VGL (Sumitomo*) 5% | 661.42 | 240.15 | 200.52 | 220.75 | 0.42 |
| 6 | Aminyl Black F-SGL (Sumitomo*) 5% | 590.06 | 219.79 | 180.86 | 189.41 | 0.85 |

*Mitsui:Mitsui Toatsu, Hodogaya:Hodogaya Kagaku, Sumitomo:Sumitomo Kagaku

The samples employing only black dyes absorb light of the long wavelength region (substantially 650 nm or higher) to a lesser extent than the light of the short wavelength region. That is, if the light of the long wavelength region enters the inside of a photographic film patrone, it sensitizes the R-layer, above all, of the photographic film, thus producing fog in the photographic film. If the port opening is reduced in width or the pile length is increased to diminish the amount of intrusion of light, the, film pull-out resistance is increased to produce scratches, or static marks in the photographic film thus presenting difficulties in commercial use of the film. Thus a small amount of light intrusion into the photographic film patrone is permitted, while the plastic container for accommodating the photographic film patrone is endowed with light shielding properties, while the plastic container is colored in black using carbon black or the like by way of compensation for putting the film to practical utilization.

However, since the plastic container for containing the photographic film patrone is colored in black for light shielding, printed notice for identification of film types or film handling on the film patrone in the plastic container becomes invisible. Thus the notice is printed with white-colored ink on the plastic container or a label with a printed legend is stuck on the container.

Consequently, the cost for the plastic container for containing a photographic film patrone used in a photographic film having the ISO sensitivity of not less than 400 is higher by not less than 20% than that of the plastic container for a non-colored film patrone as used for a photographic film having the ISO sensitivity of 100 because of costs involved in colored materials, coloring costs and color change losses. Moreover, since the same injection molding machine as that used for the plastic container for containing the non-colored photographic film patrone cannot be used, a separate molding machine, a metal mold and a resin silo are required accordingly the cost for equipment and site inclusive of the building cost is doubled or may become even higher.

Figure 2:
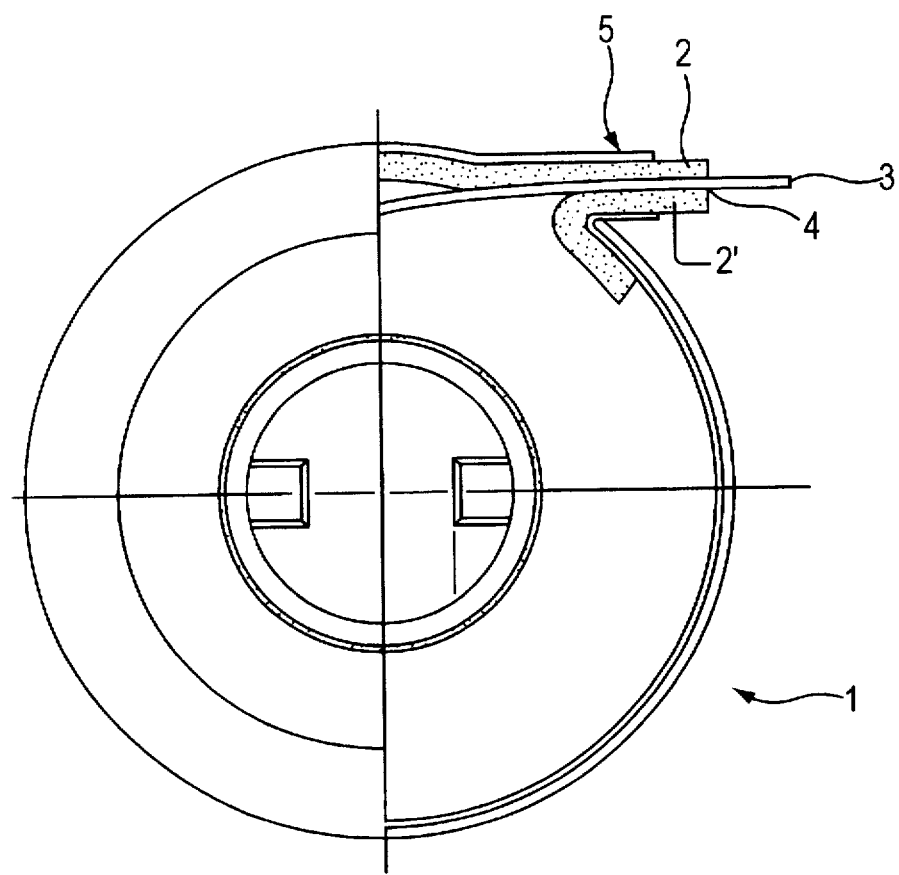
FIG. 2 is a schematic cross-sectional view showing a patrone housing therein a photographic film of the JIS 135 size according to an embodiment of the present invention.

It has now been found beyond expectation that the light fog is produced mainly in the R-layer, while the light fog in the B-layer and in the green-sensitive layer ("G-layer") is hardly produced. FIG. 2 schematically shows a JIS 135 size photographic film patrone in a cross-section. Light-shielding plushes 2, 2' are affixed to a port portion 5. The properties required of the light shielding plushes 2, 2' are light shielding properties, film draw-out properties (draw-out torque, anti-static properties and anti-scoring properties) and photographing properties. Of these, light shielding properties are most critical in protecting the photographic film from the light. The crucial character of the light shielding properties can be recognized from the fact that, if no light-shielding plush is affixed in the vicinity of the port opening 4, the light fog is produced up to fifth or sixth turns in the photographic film.

Among the factors influencing the light-shielding performance, are dyeing density of the light-shielding plush, the material type and density of the piles used for the light-shielding plush, disposition and height of the piles and compression elasticity (stress required in compression). The crucial character of the dyeing of the light-shielding plush may be understood from the fact that, if the undyed light-shielding plush is affixed, the photographic film undergoes light fog up to the fourth to fifth turns. For this reason, the conventional practice has been to dye the light-shielding plush black to assure light-shielding properties. However, the results were not necessarily satisfactory.

Figure 3:
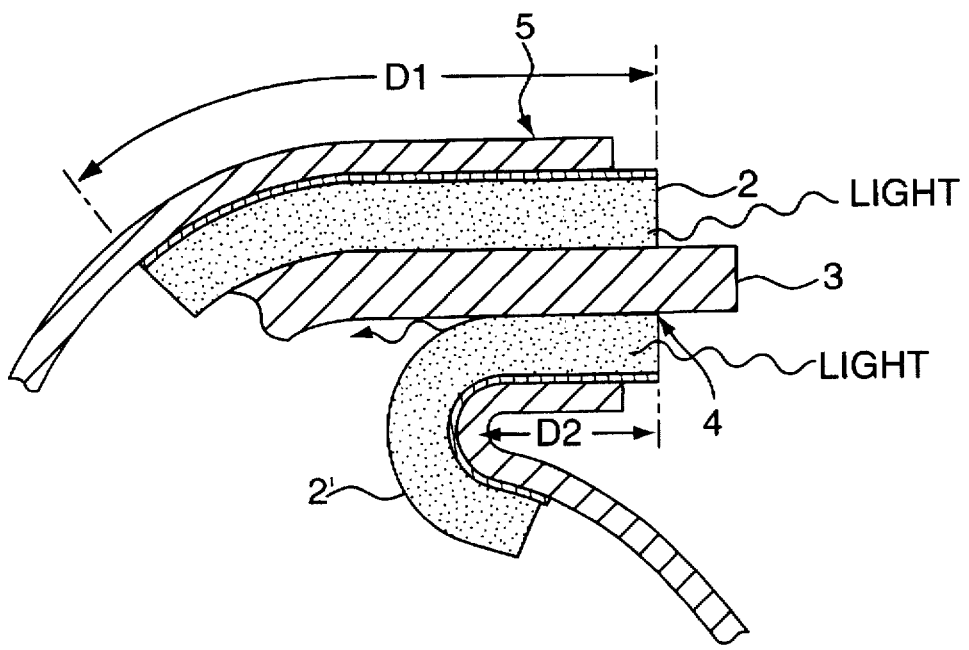
FIG. 3 is an enlarged schematic view showing the vicinity of the port open of FIG. 2 according to an embodiment of the present invention.

FIG. 3 shows the vicinity of the draw-out opening on port opening 4 of FIG. 2 to an enlarged scale. The light may intrude via a gap between the light-shielding plushes 2, 2' and the photographic film 3. As for the length of the light-shielding plush influencing the light shielding, a length D1 of the straight upper light-shielding plush 1 on the upper side of the photographic film contributing to light shielding is as long as 11.5 mm, so that the light intruded via the gap between the upper light-shielding plush 2 and the photographic film 3 tends to be absorbed by the light-shielding plush 2 disposed on the upper side of the film. On the other hand, a length D2 of the bent ("haze")-side light-shielding plush 2' on the lower side of the photographic film contributing to light shielding is as short as about 5 mm. Thus the light introduced via the gap between the lower light-shielding plush 2' and the photographic film 3 cannot be absorbed by the lower light-shielding plush 2' and hence is more likely to introduced into the inside of the main body portion of the film patrone 1. Thus the light via the back side of the photographic film 3 is mainly responsible for light sensitization of the photographic film 3 disposed within the main body portion of the photographic film patrone 1.

Figure 6:
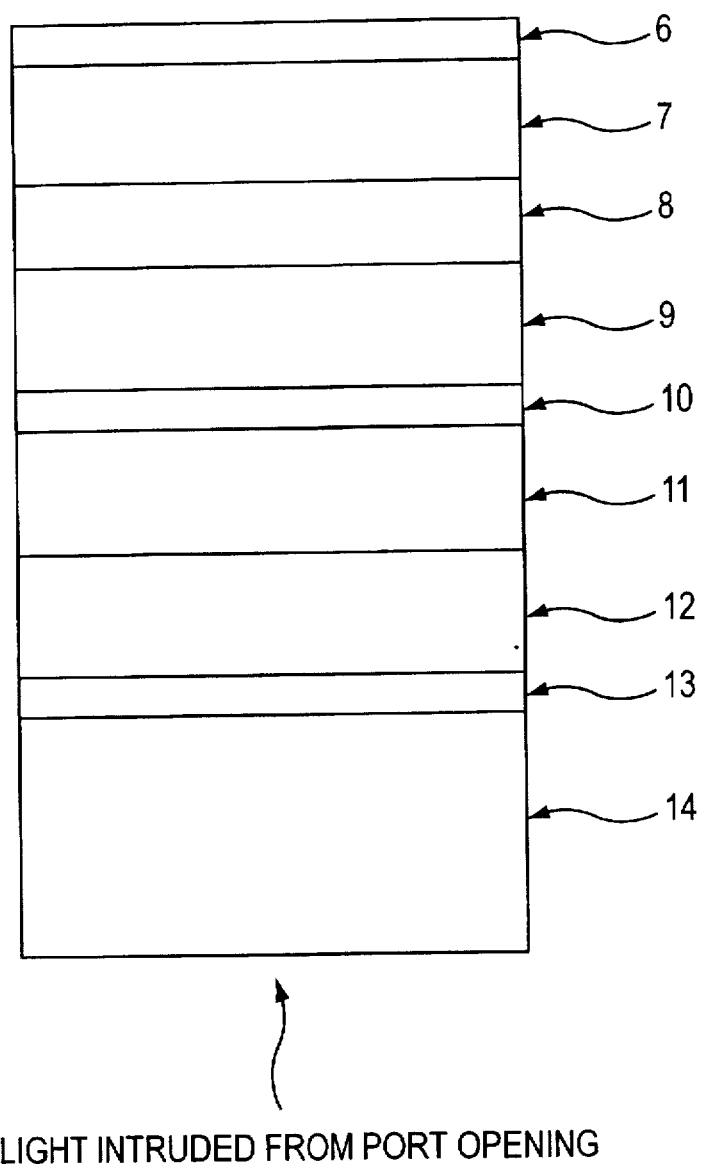
FIG. 6 is a schematic view showing the layer structure of a color negative photographic film according to an embodiment of the present invention.

FIG. 6 schematically shows the respective layers making up a photographic film. The light from an emulsion surface enters the photographic film along a path from protective layer 6 to B-layer 7, thence to yellow filter 8, thence to G-layer 9, thence to intermediate layer 10, thence to R-layer 11, thence to anti-halation layer 12, thence to undercoating layer 13, and finally to a photographic film base 14. In this case, FIGS. 4A, 4B and 4C show light sensitivity to the B-, G- and R-layers, respectively. That is, the R-layer has sensitivity in a long wavelength region (approximately 580 to approximately 690 nm) with respect to light from the emulsion surface. On the other hand, the light introduced via the port opening 4, that is from the back surface of the photographic film 3, is introduced to the photographic film via a route from the film base 14 to the undercoating layer 13, thence to the anti-halation layer 12, thence to the R-layer 11, thence to the intermediate layer 10, thence to the G-layer 9, thence to the yellow filter 8, thence to the B-layer 7 and finally to the protective layer 6. In this case, FIGS. 5A, 5B and 5C show light sensitivity to the B-, G- and R-layers, respectively. Since the R-layer has spectral sensitivity shown in FIG. 5C to the exposure light from the back surface of the photographic film 3, the R-layer is sensitive not only to the long wavelength region but also to the short wavelength region (approximately 380 to approximately 470 nm) of the light introduced via the port opening 4. Thus the R-layer undergoes light fog not only by long wavelength light components but also by short wavelength light components of the light introduced via the port opening 4.

That is, as for the light fog caused by the light from the port opening 4, that is light fog by the exposure light from the back surface of the photographic film 3, since the R-layer has substantially the same sensitivity in the long wavelength light (approximately 580 to approximately 690 nm) and in the short wavelength light (approximately 380 to approximately 470 nm), light fog of the R-layer is governed by the spectra absorption SQ value (380–495)+SQ value (585–690) of the spectral sensitivity region of the R-layer (referred to hereinafter as the "SQ values of the R-layer"). The container for preventing light fog of the R-layer is a container for a web-shaped photosensitive material having a light-shielding member colored with a color dye having the SQ value of the R-layer of not less than 400, preferably not less than 420, more preferably not less than 440 and most preferably not less than 450.

The G-layer is not susceptible to fog, caused by light introduced by the port opening 4 since at the G-layer the green light has been already absorbed. In addition, the B-layer is least susceptible to fog since the blue light is absorbed by the G-layer and the yellow filter. Thus the light fog is most likely to occur in the R-layer due to light intrusion via the port opening 4. The present invention has been completed based on this finding.

For completely preventing light fog from occurring in the web-shaped photosensitive material, a first aspect of the invention is directed to a photosensitive web-shaped container including a core around which is wrapped a web-shaped photosensitive material in the form of a roll, a draw-out opening via which the photographic photosensitive material is drawn out, and a light-shielding member provided in the port opening, wherein the light shielding member is dyed with a coloring dye having spectral absorption (SQ value) in a spectral sensitivity region of at least an "R-layer" of the web-shaped photographic photosensitive material.

2nd to 5th aspects represent preferred embodiments. That is, the 2nd aspect is directed to a container according to the first aspect, in which the light-shielding member is dyed with a coloring dye having spectral absorption (SQ value) in the spectral sensitivity regions of a B-layer and the R-layer of the web-shaped photosensitive material. The 3rd aspect is directed to a container according to the 1st or 2nd aspect in which the light-shielding member is dyed with blue dyes or the like (termed as "bluish dyes") and with a black dye. The 4th aspect is directed to container according to the 3rd aspect, in which the weight ratio of the black dye in the color dye to the blue dye or the like is 50 to 98:50 to 2. The 5th aspect is directed to a container according to any of the 1st to 4th aspects, in which the web-shaped photographic photosensitive material is a color negative photographic film with an ISO sensitivity of not less than 400.

DESCRIPTION OF PREFERRED EMBODIMENTS

The light-shielding member that may be used in the present invention may be of any type if it is effective to prevent light intrusion into the inside of the web-shaped photosensitive material. It may, for example, be a light-shielding plush, electrically planted wool, non-woven fabric, sponge, paper or the like. Of these, the light-shielding plush is most preferred in view of prevention of scoring of the web-shaped photosensitive material, prevention of ill effects on photographing performance, dust-proofing property, light-shielding property and draw-out torque etc.

Figure 7:
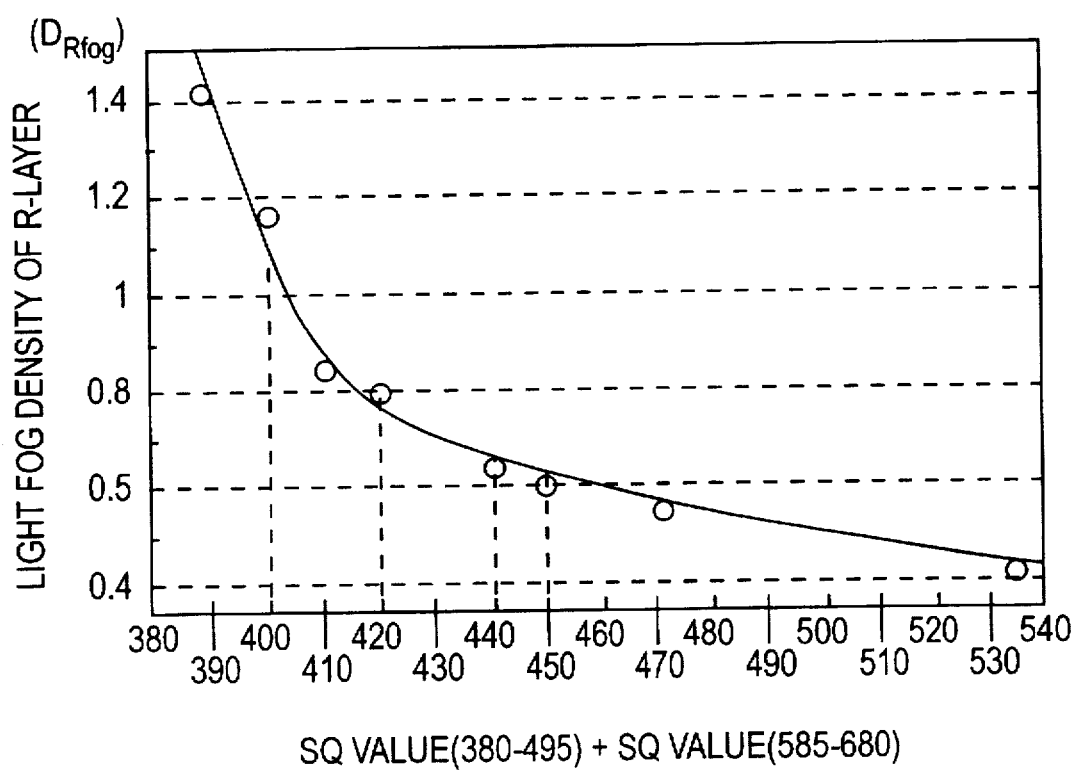
FIG. 7 is a graph showing the relation between the SQ value of the R-layer (SQ value (380–495 nm)+SQ value (585–680 nm)) and light fog density of the R-layer.

The light intrusion via the port opening mainly produces light fog in the R-layer, as described above. FIG. 7 shows the relation between the SQ value and the light fog density of the R-layer obtained by using various dyes in combination. FIG. 7 show the correlation between the sum of absorption of the 585 to 680 nm region and the 380 to 495 nm region, that is the SQ value (380 to 495)+the SQ value (585 to 680), and the light-shielding performance, that is $D_{Rfog}$ (light fog density of the R-layer) in consideration that it has been found that the R-layer also has sensitivity to 380 to 495 nm such that the 585 to 680 nm region and the 380 to 495 nm region exhibit the same level of sensitivity to the light incident on the reverse side of the photographic film. FIG. 7 illustrates the extremely good correlation between the two. Thus, for preventing such light fog in the R-layer, a dye (or dyes) having spectral absorption at least in the spectral sensitivity region in the R-layer and preferably also having spectral absorption in the spectral sensitivity region in the B-layer is required as a dye (or dyes) used for the light-shielding plush. Although the R-layer range varies with the sorts of the sensitizer colorant materials, the R-layer range is preferably approximately 580 to approximately 680 nm in the present invention. The B-layer range, on the other hand, is preferably approximately 380 to approximately 480 nm.

Figure 8:
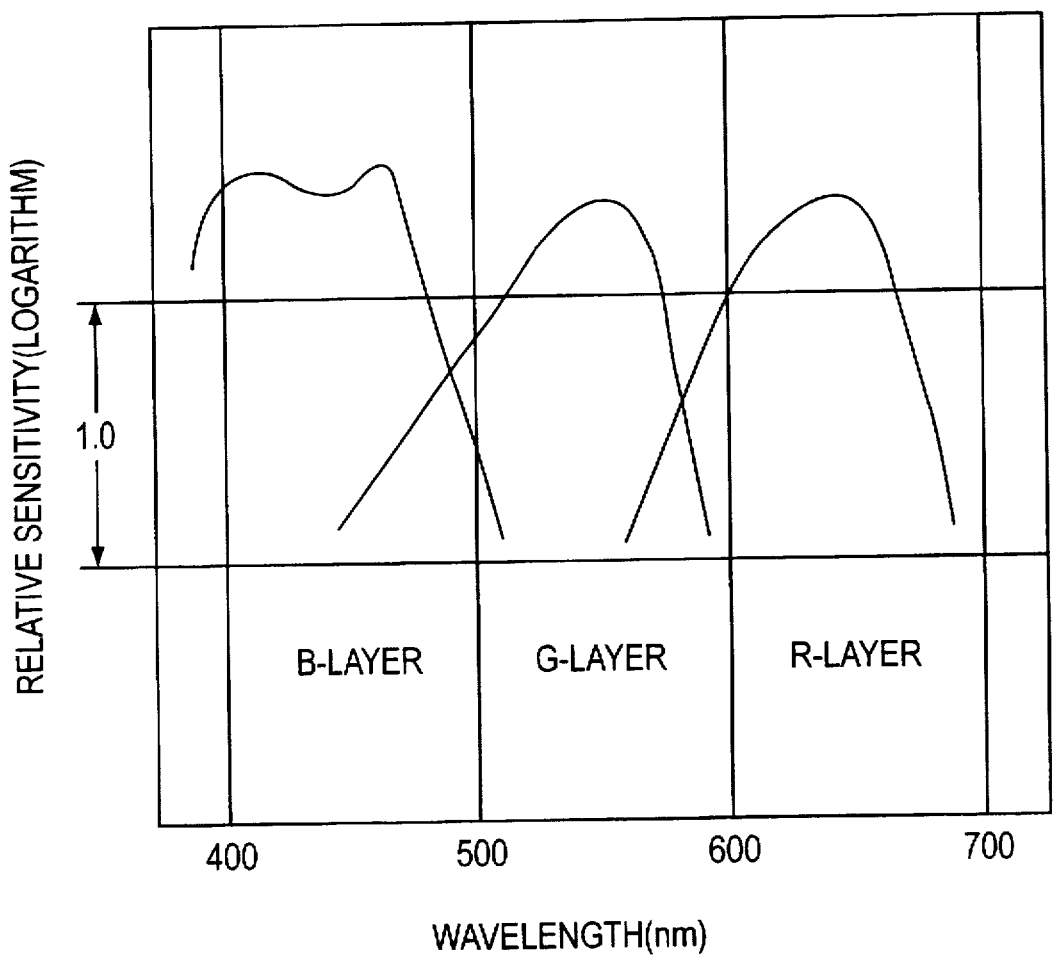
FIG. 8 is a graph showing a photosensitivity curve for a color negative photographic film having ISO sensitivity of 400.
Figure 9:
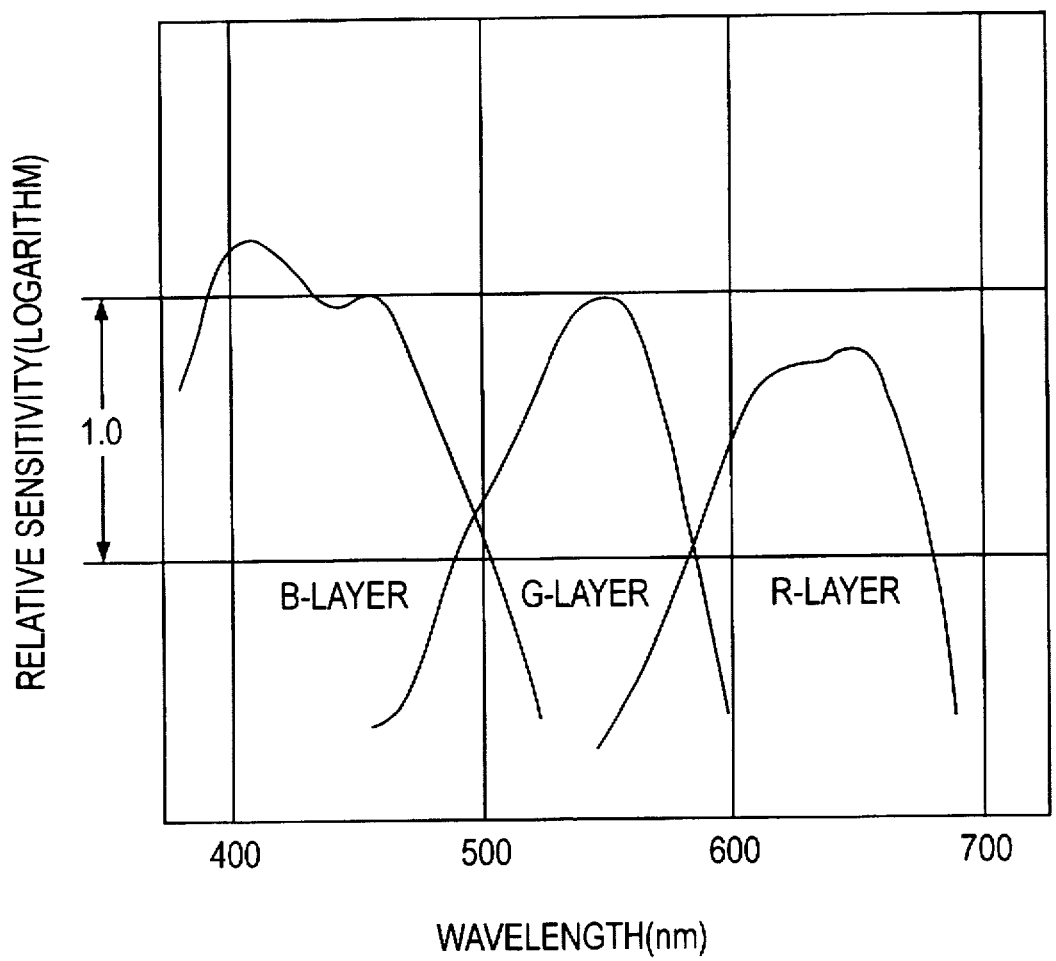
FIG. 9 is a graph showing a photosensitivity curve for a color negative photographic film having ISO sensitivity of 100.

Although any dyes satisfying the above conditions may be used, the conventional black dye is poor in absorption of light having a wavelength of not less than approximately 650 nm (see FIG. 1). On the other hand, the black dye exhibits superior absorption to the light having the wavelength not higher than approximately 650 nm. This is outstanding for the density of the black dye not lower than 5% o.w.f (see FIG. 1). Thus it is most preferred to use a dye showing superior absorption to the light with a wavelength of not less than 650 nm and a black dye in combination for preventing light intrusion into the inside of the photographic patrone and for preventing light fog on the photographic film. In addition, the density-of not less than 5% o. w. f of the black dye used in combination is most desirable in preventing light fog of the photographic film. However, the dye with a color hue other than the black hue may also be used if the light having a wavelength less than approximately 650 nm can thereby be absorbed. Meanwhile, the SQ value required for preventing light fog varies with the ISO sensitivity of the photographic photosensitive material (see FIGS. 8 and 9). FIG. 8 shows a spectral sensitivity for a color negative photographic film (ISO sensitivity 400). FIG. 9 shows a spectral sensitivity for a color negative photographic film (ISO sensitivity 100). The processing is CN-16, density measurement is equivalent to Status M and the minimum density is +1.0.

It is seen from FIG. 7 that any dye exhibiting superior absorption with respect to the light with a wavelength of not less than approximately 650 nm without adversely affecting the properties, such as photographing properties, of the photosensitive material may be used. Blue-colored dyes, green-colored dyes and violet-colored dyes are most preferred. Alternatively, a blue-green dye exhibiting a color hue intermediate between the blue dye and the green dye may also be used. At any rate, the light fog of the photosensitive material may be prevented by using, in combination, such color dyes as have the SQ value of the R-layer of not less than 400, preferably not less than 420, more preferably not less than 440 and most preferably not less than 450. If the SQ value of the R-layer is not less than 420, light fog may be prevented even with the photosensitive material with the ISO sensitivity of not less than 400. If the SQ value of the R-layer is not less than 440, light fog may be prevented even with a photosensitive material with an ISO sensitivity of not less than 1000.

The dye means which selectively absorbs or reflects the visible light rays, becomes attached to vegetable, animal or synthetic fibers by a suitable dyeing method and exhibits stability with respect to sunlight, laundry, friction or sublimation.

The dyes may be classified by dyeability and by the chemical structure. By dyeability, the dye may be classified into direct dye, acidic dye, basic dye, acidic mordant dyes, metal complex salt dyes, sulfide dyes, vat dyes, soluble vat dyes, azoic dyes (naphthol dyes), dispersion dyes, reaction dyes, oxidization dyes, and oil-soluble dyes. The black dyes, blue dyes, green dyes or violet dyes may be used without any limitation for the light-shielding plush and without regard to the above classification. If the spectral absorption of the black dye is specific, it may be used in combination with the red dye rather than in combination with the blue dye since the SQ value then becomes larger to prevent light fog in the photosensitive material. In such case, the black dye and the red dye may be used in combination.

The black dyes may be enumerated by, for example, Celliton Fast Black B TNA (water-soluble dispersion dye), Acetamine Diazo Black RB (azoic dye), Dispersol Diazo Black B, 2BS (azoic dye), Artisil Diazo Black B (azoic dye), Setacyl Diazo Black B.S.(azoic dye), Latyl Diazo Black B (azoic dye), C.I. Sulphur Black 4, 38 (sulfide dye), C.I. Direct Black 28 (direct dye), C.I. Acid Black 21 (Sulfone Cyanine Black 8B) (acid dye), Acetamine Diazo Black 3B (azoic dye) and aniline black (oxidization dye).

The blue dyes may be enumerated by, for example, Celliton Blue GA Extra CF (dispersion dye), Celliton Fast Blue FFRN RExtra conc. (dispersion dye), Celliton Fast Blue LAFR (dispersion dye), Latyl Blue FL. (dispersion dye), Latyl Brilliant Blue 2G (dispersion dye), Latyl Blue 4R, RL, RB (dispersion dye), Duranol Blue G (dispersion dye), Perliton Blue B, 3G (dispersion dye), C.I. vat Blue 4, 43 (vat dye) and Perliton Navy Blue Br (dispersion dye).

The violet dyes may be enumerated by, for example, by Celliton Fast Violet BA-CF (dispersion dye), Latyl Violet BN, 2R (dispersion dye), C.I. Direct Violet 11, 12 (direct dye), and C.I. Vat Violet 1, 2, 4 (vat dye).

The green dyes may be enumerated by, for example, C.I. Direct green 1, 6, 8 (direct dye) and C.I. Vat Green 1 (vat dye).

The above dyes are merely illustrative and the dyes according to the present invention are not limited to the above exemplary dyes. For example, the combination of the blacks dyes and the red dyes, the combination of the black dye and the yellow dye or the combination of three or more dyes may be used. The weight ratio of the black dye to the blue dye is 50 to 98:50 to 2, preferably 60 to 95:40 to 5 and more preferably 80 to 90:20 to 10. If the dye is used in this range in the light-shielding plush, the light in the visible range tending to be introduced into the photographic patrone may be offoctively absorbed to prevent light tog in the photographic film.

The dyeing method may be roughly classified into dip dyeing and printing corresponding to plain dyeing and pattern dyeing, respectively. In principle, if the dye is in the form of an aqueous solution and a fibrous material is dipped therein, dip dying results. If the dye and the sizing agent are mixed to form a sizing for printing which is printed according to a pattern on a fabric cloth for transferring the dye from the sizing to the cloth, printing results.

The fibers to be dyed may be enumerated by vegetable natural fibers, such as cotton or jute, animal fibers, such as wool or silk, regenerated fibers, such as viscose or cupla, semi-synthetic fibers, such as acetate or triacetate and synthetic fibers, such as polyamide, polyester, polypropylene, polyacrylonitrile or polyvinyl alcohol formal compounds. Diversities in the chemical structure in these dyes provide a wide range of dyeability. In the case of the synthetic or semi-synthetic fibers, the physical structure produced by conditions such as stretching or heat treatment at the time of fiber production affects dyeability significantly. The chemical properties, such as water solubility or ionic properties, of the dyes differ with the above classification, such that certain limitation is imposed on the fibers that can be used. The reason is that dye molecules or ions must have intermolecular interaction with the macro-molecules making up the fiber material. In general, hydrophilic dyes are affixed to the hydrophilic fibers, while hydrophobic dyes are affixed to the hydrophobic fibers. This relation coincides with the principle of "like dissolves like" stating that materials having similar chemical structures are miscible satisfactorily with each other, and may be qualitatively estimated by the organic/inorganic ratio.

Given the fibers, the dye classes suited thereto are determined, and dyes of desired color hues are selected from among these classes in order to effect dyeing. What is technologically required is homogeneous dyeing. If dyes with homogeneous dyeing cannot be used, homogeneous dyeing is achieved by improving mechanical conditions, such as agitation or fluidizing of the dyeing solution, for apparatus, or by using homogeneous dying assistant agents, such as level dying agents or moderate dyeing agents. The dyeing assistant agents include wetting agents, penetrants, dispersing agents and fastness improvers. In its broad interpretation, the dyeing assistant agent includes an inorganic acid used for wool dyeing by acidic dyes, mordant dyes and sizing for printing.

Thus, in an actual dyeing system, a variety of assistant agents are contained in a dye bath in Addition to dyes, usually two or more dyes. If high molecular fibers are contained in the dyeing system, interaction occurs between various species.

The materials to be dyed assume various configurations, even if the fibers are of the same species, in addition to the above-mentioned diversities of the high-molecular materials. These configurations may be enumerated by loose fiber dyeing for staple (flocculated staple in case of natural fibers), cheese dyeing of long filaments, cake dyeing, yarn dyeing, hank dyeing, cloth dyeing of woven fabrics, or hosiery dyeing. Loose fiber dyeing machines, cheese dyeing machines, jiggers or hank dyeing machines are used depending on the types of dyeing.

The method for dyeing (dipping) the polyester fibers is explained next. Polyester fibers are dyed by carrier dyeing using dispersion dyes, high-temperature dyeing, naphthol dyeing or vat dyeing. Of these, the dispersion dyeing is used most extensively. The polyester fibers are hydrophobic and are hardly swollen in water. In addition, the polyester fibers are dense in structure and resists intrusion of dye molecules. Therefore, a swelling agent known as carrier is used, or thermal movement of the polyester chains is activated at a temperature exceeding 100° C. for facilitating intrusion of dye molecules. In carrier dyeing, o-phenylphenol is dissolved in caustic soda dissolved in a minor amount of water and the resulting solution is added to a bath containing the dye and the non-ionic activating agent to form a dye bath. In high-temperature dyeing, dyeing is carried out at 120° to 130° C. for 60 minutes in a bath containing 1 ml $l^{-1}$ of 40% acetic acid or 0.5 g $l^{-1}$ of ammonium sulfate, 0.5–1 g $l^{-1}$ of dispersing agent and a dispersion dye. In thermosol dyeing, after padding with a dispersion solution of a dispersion dye, drying at 150° C. and dry heat treatment at 180° C. for 60 to 90 seconds are carried out in this order. Dyeing the polyester by the naphthol dye is carried out by a single bath method. As for dying, refer to Kagakubinran, Ouyo-hen, revised third edition, Japan Chemical Society, pages 996 to 1008, 1980.

As an illustrative example of the synthetic fibers, dyeing of a light-shielding plush by nylon 6,6 is explained.

The structure of the light-shielding plush is a basic cloth in which piles of nylon 6,6 (100 deniers thickness/48 filaments, about 32000/cm$^2$ in density) is in a V-texture, warp yarns (120 deniers thickness/40 filaments) and weft yarns (150 deniers thickness/30 filaments) of viscose rayon are woven at a weft impelling rate of 145±5/3.788 cm in a twill weave. The apparatus used are a Rapier loom and a Wince dyeing machine. For drying for the final step, a ribbon drying machine is used.

After water washing at 20° C. for 15 minutes, desizing and scouring are carried out. Using Kayaras Black G Conc., a dye for viscose rayon, manufactured by NIPPON KAYAKU K. K., Acidic Nylon Black GL manufactured by SUMITOMO KAGAKU K. K. and Aminil Blue F-GL manufactured by SUMITOMO KAGAKU K. K., with the black dye to blue dye weight ratio of 4:1, along with an assistant agent composed of 30.0% of mirabilite and 0.2% of acetic acid, dyeing is carried out with a dyeing density of 5.0% o. w. f., a bath ratio of 1:30, at a temperature of 95° to 100° C. for 60 minutes. Then, after water washing at 20° C. for 15 minutes, soaping is carried out at 50° C. for 20 minutes using 0.2% newsunlex manufactured by NIKKA KAGAKU K. K. as an assistant agent. Then, after washing with water at 40° C. for 20 minutes, softening treatment is carried out at 40° C. for 15 minutes using 3.5 g/l of sansofron. Then, an anti-static processing is carried out at 20° C. for 15 minutes, using 1.0% of Deatron N, manufactured by NISSAN KAGAKU K. K. as an anti-static agent. Finally, drying was carried out with a running distance speed of 2.0 to 3.9 m/minutes, using a ribbon drier, to complete dyeing.

The present invention will now be explained with reference to illustrative examples which are not intended for limiting the invention.

EXAMPLE 1

A light shielding plush composed of polyester fibers was produced using a high-pressure liquid flow dyeing machine by immersion in a processing liquid containing an aqueous suspension of a block copolymer of terephthalic acid/ethylene glycol/polyethylene glycol, an anionic anti-static agent, a lubricant, a black dye and a blue dye, with the black dye to blue dye weight ratio of 8:2, and with the dye density in the processing liquid of 7 % o. w. f, processing at 120° C. for 30 minutes and followed by sufficient soaping. The resulting product was taken out of the high pressure liquid flow type dyeing machine and centrifuged for dehydration.

The light-shielding plush was provided in a usual manner in a port opening of a JIS 135 size photographic film patrone. A color negative photographic film, placed around a spool with an ISO sensitivity of 800, was loaded in a photographic film patrone which was then housed within a transparent plastic container designed for housing a photographic film patrone. The resulting assembly was exposed under this condition to a sunbeam of 80,000 lux for two hours and subsequently developed in a usual manner in order to check the presence of fogging irregularities in photographing properties and marks of adhesion. The pile yarns of the light-shielding plush were disposed inclined in the film draw-out direction.

The light-shielding plush had a pile density of 38,000/cm² and a height of the pile yarns of 1.65 mm. The pile had a length of 11.5 mm on the straight side contributing to light shielding, and a length of 5 mm on the bent("haze") side contributing to light shielding. The stress for compressing the piles by 0.3 mm was 66 g/cm², while that for compressing the piles by 0.5 mm and 0.6 mm were 257 g/cm² and 490 g/cm², respectively.

EXAMPLE 2

A light-shielding plush of polyester fibers, which was identical with the one of Example 1 except for substituting a violet dye for the blue dye of Example 1, was produced, and was provided at a port opening of the same JIS 135 size photographic film patrone as that of Example 1 in order to check for the same properties as those checked in Example 1.

EXAMPLE 3

A light-shielding plush of polyester fibers, which was identical with the one of Example 1 except for substituting a green dye for the blue dye of Example 1, was produced, and was provided at a port opening of the same JIS 135 size photographic film patrone as that of Example 1 in order to check for the same properties as those checked in Example 1.

EXAMPLE 4

A light-shielding plush of polyester fibers, which was identical with the one of Example 1 except for substituting a violet dye and a blue dye for the blue dye of Example 1, was produced, and was provided at a port opening of the same JIS 135 size photographic film patrone as that of Example 1 in order to check for the same properties as those checked in Example 1. The weight ratio of the black dye, violet dye and the blue dye was 80:5:15.

EXAMPLE 5

A light-shielding plush of nylon fibers was produced in the same way as in Example 1 except for substituting nylon fibers for the polyester fibers and substituting a Wince dyeing machine for the high-pressure liquid flow dyeing machine, and was provided at a port opening of the same JIS 135 size photographic film patrone as that of Example 1 in order to check for the same properties as those checked in Example 1. The pile density of the light-shielding plush was 32,000/cm², and the pile yarn was of a height of 1.65 mm. The pile has a length of 11.5 mm on the straight side contributing to light shielding, and a length of 5 mm on the bent("haze") side contributing to light shielding. The stress for compressing the piles by 0.3 mm was 66 g/cm², while that for compressing the piles by 0.5 mm and 0.6 mm were 209 g/cm² and 388 g/cm², respectively.

EXAMPLE 6

A light-shielding plush of polyester fibers, which was identical with the one of Example 5 except for substituting a blue dye and a green dye for the blue dye of Example 5, was produced, and was provided at a port opening of the same JIS 135 size photographic. film patrone as that of Example 1 in order to check for the same properties as those checked in Example 1. The weight ratio of the black dye, blue dye and the green dye was 80:10:10.

EXAMPLE 7

A light-shielding plush of nylon fibers, which was identical with the one of Example 5 except for changing the weight ratio of black dye to blue dye in Example 5 to 95:5, was produced, and was provided at a port opening of the same JIS 135 size photographic film patrone as that of Example 1 in order to check for the same properties as those checked in Example 1.

EXAMPLE 8

A light-shielding plush of nylon fibers, which was identical with the one of Example 5 except for changing the weight ratio of black dye to blue dye of Example 5 to 55:45, was produced, and was provided at a port opening of the same JIS 135 size photographic film patrone as that of Example 1 in order to check: for the same properties as those checked in Example 1.

EXAMPLE 9

A light-shielding plush of nylon fibers was produced in the same way as in Example 5 except substituting a high-pressure liquid flow dyeing machine for the wince dyeing machine of Example 5, and was provided at a port opening of the same JIS 135 size photographic film patrone as that of Example 1 in order to check for the same properties as those checked in Example 1.

Comparative Example 1

A light-shielding plush of polyester fibers, which was identical with the one of Example 1 except for substituting a sole black dye for the color dyes of Example 1, was produced, and was provided at: a port opening of the same JIS 135 size photographic film patrone as that of Example 1 in order to check for the same properties as those checked in Example 1.

Comparative Example 2

A light-shielding plush of polyester fibers, which was identical with the one of Example 1 except for substituting a sole blue dye for the color dyes of Example 1, was produced, and was provided at a port opening of the JIS 135 size photographic film patrone as that of Example 1 in order to check for the same properties as those checked in Example 1.

Comparative Example 3

A light-shielding plush of polyester fibers, which was identical with the one of Comparative Example 2 except for setting the piles of the light-shielding plush of comparative Example 2 erect, as produced, and was provided at a port opening of the same JIS 135 size photographic film patrone as that of Example 1 in order to check for the same properties as those checked in Example 1.

Comparative Example 4

A light-shielding plush of polyester fibers, which was identical with the one-of Example 1 except for changing the weight ratio of black dye to blue dye to 99:1 and except for not using the anti-static agent nor the lubricant, was produced, and was provided at a port opening of the same JIS 135 size photographic film patrone as that of Example 1 in order to check for the same properties as those checked in Example 1.

Comparative Example 5

A light-shielding plush of polyester fibers, which was identical with the one of Example 1 except for substituting the yellow dye for blue dye and except for not using the anti-static agent nor the lubricant, was produced, and was provided at a port opening of the same JIS 135 size photographic film patrone as that of Example 1 in order to check for the same properties as those checked in Example 1.

Comparative Example 6

A light-shielding plush of polyester fibers, which was identical with the one of Comparative Example 1 except for removing the lubricant of Comparative Example 1 (amount of deposition, 1.0 wt%) and setting the piles of the light-shielding plush of comparative Example 1 erect, was produced, and was provided at a port opening of the same JIS 135 size photographic film patrone as that of Example 1 in order to check for the same properties as those checked in Example 1.

The results of comparison of the contents and properties of the respective dyes are shown in Tables 2 and 3. The criteria of evaluation after visual check and judgment are as follows:

TABLE 2

| | | Examples | | | | | | | | |
|---|---|---|---|---|---|---|---|---|---|---|
| | | 1 | 2 | 3 | 4 | 5 | 6 | 7 | 8 | 9 |
| Contents of Coloring Dyes | | | | | | | | | | |
| Black Dye | wt Ratio | 80 | 80 | 80 | 80 | 80 | 80 | 95 | 55 | 80 |
| Blue Dye | of Dyes | 20 | 0 | 0 | 15 | 20 | 10 | 5 | 45 | 20 |
| Violet Dye | | 0 | 20 | 0 | 5 | 0 | 0 | 0 | 0 | 0 |
| Green Dye | | 0 | 0 | 20 | 0 | 0 | 10 | 0 | 0 | 0 |
| Yellow Dye | | 0 | 0 | 0 | 0 | 0 | 0 | 0 | 0 | 0 |
| Dyeing Machine | | High-Pressure Liquid Flow Type Dyeing Machine | | | | Wince Dyeing Machine | | | | High Pressure Liquid Flow Type Dyeing Machine |
| Deposited Amount of Lubricant | wt % | 1.0 | 1.0 | 1.0 | 1.0 | 1.0 | 1.0 | 1.0 | 1.0 | 1.0 |
| Deposited Amount of Anti-Static Agent | wt % | 1.0 | 1.0 | 1.0 | 1.0 | 1.0 | 1.0 | 1.0 | 1.0 | 1.0 |
| Polyester Fibers | — | ○ | ○ | ○ | ○ | — | — | — | — | — |
| Nylon Fibers | — | — | — | — | — | ○ | ○ | ○ | ○ | ○ |
| Pile Density | number/cm² | 38000 | 38000 | 38000 | 38000 | 32000 | 32000 | 32000 | 32000 | 32000 |
| Pile Height | mm | 1.65 | 1.65 | 1.65 | 1.65 | 1.70 | 1.70 | 1.70 | 1.70 | 1.70 |
| Pile State | — | inc.* | inc.* | inc.* | inc.* | inc.* | inc.* | inc.* | inc.* | inc.+ |
| Light Shielding (Light Fog) | — | ◎ | ◎ | ○ | ◎ | ◎ | ○ | ○ | ● | ◎ |
| Photographing Properties | — | ○ | ○ | ○ | ○ | ○ | ○ | ○ | ○ | ○ |
| Adhesion Marks | — | ○ | ○ | ○ | ○ | ○ | ○ | ○ | ○ | ○ |
| Film Pullout Torque | — | ◎ | ◎ | ◎ | ◎ | ◎ | ◎ | ◎ | ◎ | ◎ |
| Anti-Static Properties | — | ○ | ○ | ○ | ○ | ○ | ○ | ○ | ○ | ◎ |
| Film Scoring | — | ○ | ○ | ○ | ○ | ○ | ○ | ○ | ○ | ◎ |
| Pile Waste | — | ○ | ○ | ○ | ○ | ○ | ○ | ○ | ○ | ○ | inc.*: pile yarns inclined relative to Film Drawout Direction
inc.+: pile yarns inclined into four directions

TABLE 3

| | | Comparative Examples | | | | | |
|---|---|---|---|---|---|---|---|
| | | 1 | 2 | 3 | 4 | 5 | 6 |
| Contents of Coloring Dyes | | | | | | | |
| Black Dye | wt Ratio | 100 | 0 | 0 | 99 | 80 | 100 |
| Blue Dye | of Dyes | 0 | 100 | 100 | 1 | 0 | 0 |
| Violet Dye | | 0 | 0 | 0 | 0 | 0 | 0 |
| Green Dye | | 0 | 0 | 0 | 0 | 0 | 0 |
| Yellow Dye | | 0 | 0 | 0 | 0 | 20 | 0 |
| Dyeing Machine | | Hi-Pressure Flow Type Dyeing Machine | | | | | |
| Deposited Amount of Lubricant | wt % | 1.0 | 1.0 | 1.0 | 0 | 0 | 0 |

TABLE 3-continued

| | | Comparative Examples | | | | | |
|---|---|---|---|---|---|---|---|
| | | 1 | 2 | 3 | 4 | 5 | 6 |
| Deposited Amount of Anti-Static Agent | wt % | 1.0 | 1.0 | 1.0 | 0 | 0 | 1.0 |
| Polyester Fibers | — | ○ | ○ | ○ | ○ | ○ | — |
| Nylon Fibers | — | — | — | — | — | — | — |
| Pile Density | number/cm² | 38000 | 38000 | 38000 | 38000 | 38000 | 38000 |
| Pile Height | mm | 1.65 | 1.65 | 1.65 | 1.65 | 1.65 | 1.65 |
| Pile State | — | inc.* | inc.* | erect# | inc.* | inc.* | erect# |
| Light Shielding (Light Fog) | — | Δ | x | x | Δ–● | x | Δ |
| Photographing Properties | — | ○ | ○ | ○ | ○ | ○ | ○ |
| Adhesion Marks | — | ○ | ○ | ● | ○ | ○ | ● |
| Film Pullout Torque | — | ⊚ | ⊚ | ● | Δ | Δ | Δ |
| Anti-Static Properties | — | ○ | ○ | ○ | Δ | Δ | ● |
| Film Scoring | — | ○ | ○ | ● | ● | ● | Δ |
| Pile Waste | — | ○ | ○ | ○ | ● | ● | ● | inc.*: pile yarns inclined relative to film drawout direction
erect#: pile yarns set upright
Criteria of Evaluation
⊚: excellent;
○: good;
●: practically acceptable;
Δ: yet to be improved;
x: unusable.

It can be confirmed from Tables 2 and 3 that Examples 1 to 9 are superior in light-shielding properties to Comparative Examples 1 to 6. It can also be confirmed that the light-shielding plush with inclined piles is superior to that with erect piles, and that the plush processed with a processing liquid containing the anti-static agent and the lubricant is superior in photographic film draw-out torque, anti-static performance, anti-scoring performance and in generation of waste piles to that processed with a processing solution not containing the anti-static agent nor the lubricant. In particular, in Example 9, in which the direction of pile inclination is not constant but in four directions, light fog is decreased further beyond expectation. The plush of Example 9 was further superior in anti-static and anti-grazing performance.

EXAMPLE 10

Figure 10:
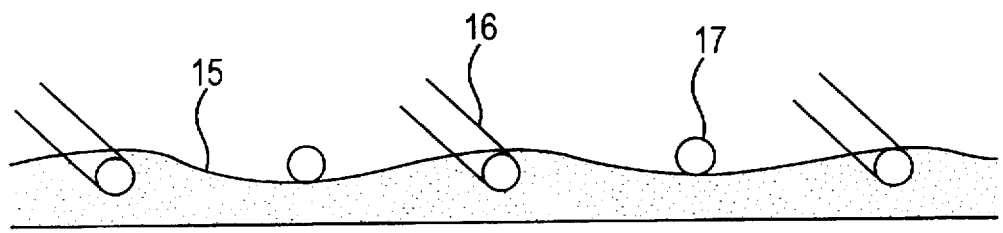
FIG. 10 is a schematic cross-sectional view showing a light-shielding plush of a woven cloth according to an embodiment of the present invention.

A light-shielding plush shown in FIG. 10 is a velvet fabric having a woven fabric structure in which a basic cloth composed of a warp yarn 15 of rayon with 120 denier/40 rayon filaments and a weft yarn 17 of rayon with 150 denier/30 rayon filaments was formed using a shuttle loom, and pile yarns 16 of nylon 6,6 of 100 deniers/48 filaments were woven into the basic cloth. The weft yarn 17 had an impelling density of 64 per inch. The pile yarns 16 were shorn to a height of 1.65 mm, using a shearing machine, and the resulting light-shielding plush was dyed with a black dye and a blue dye (weight ratio of 80:20, dye density 7% o. w. f) in one-bath two-step dyeing using a Wince dyeing machine. After dyeing, soaping was carried out sufficiently. The resulting plush was taken out from the Wince dyeing machine and dehydrated by centrifugation. The piles were inclined by a drum drier having a brushing roll. The back side of the inclined light-shielding plush was coated with an acrylic sealing agent to provide a light-shielding plush for a photographic film patrone loaded with a photographic film having ISO sensitivity of 800. The pile density of the light-shielding plush having the woven fabric structure thus prepared was 32000/cm² and a pile thickness (height) of 1.70 mm. The same properties as those checked in Example 1 were observed and checked of a photographic film patrone employing this light-shielding plush. It was found that the light-shielding properties, photographing properties, marks of adhesion and film draw-out torque were excellent good, good and excellent respectively, while the anti-static properties, anti-scoring properties and generation of waste piles were all good. The criteria of judgment are the same as those of the Examples 1 to 9 and the Comparative Examples 1 to 6.

EXAMPLE 11

A light-shielding plush was prepared in the same way as in Example 10 except using a green dye and a green dye in place of the blue dye in Example 10. The light-shielding plush thus produced was processed in the same way as in Example 1 to form a light-shielding plush for a photographic film patrone. The weight ratio of the black dye, violet dye and the green dye was 80:10:10. This plush was checked as to the same characteristics as those checked in Example 10. It was found that the plush was superior as that of Example 10.

Preferred modes for carrying out the inventions will be hereinafter further explained. A container for a web-shaped photosensitive material having a core about which is placed the web-shaped photographic photosensitive material in the form of a roll, a port opening and a light-shielding plush provided at the port opening, in which the coloring dye has a spectral absorption (SQ value) at least in a range of 580 to 680 nm, or a container for a web-shaped photosensitive material having a core about which is placed the web-shaped photosensitive material in the form of a roll, a port opening and a light-shielding plush provided at the port opening, in which the coloring dye has spectral absorption (SQ values) at least in a range from 380 to 480 nm and in a range from 580 to 680 nm. These containers are effective to prohibit light entrance and light fog of a photographic film or the like.

The anti-static agent and the lubricant used for dyeing will now be explained. The surface of long fibers, such as polyester or nylon fibers, are freed of the anti-static agents or oiliness agents after dyeing, and are liable to be electrically charged due to friction. For minimizing the phenomenon of electric charging otherwise produced during cutting, sewing and use, such as spark discharge, sticking or adsorption of dry powders, it is most preferred to use anti-static agents concomitantly at the time of ultimate finishing.

The function of the anti-static agent is to dissipate static electricity generated by friction with the moisture adsorbed to hydrophilic groups of the anti-static agent and to prevent static electricity from being generated, by means of electrical conductivity inherent to the ionic anti-static agent. At any rate, the phenomenon of electric charging depends on the material in contact, contact work and relative humidity. In particular, there is imposed a limitation to the effect of prevention of electric charging at lower temperatures. Moreover, the surface resistance, that is the effect of prevention of electric charging, is decreased with lapse of time as from the processing with the anti-static agent. This tendency, which is most outstanding in the case of nylon, is believed to be ascribable to migration of the anti-static agent from the surface into the inside of the nylon.

The anti-static agent may be enumerated by, for example, alkylamines, hydantoin derivatives, amidoamines, ester amides, acrylic acid ester derivatives, acrylic acid amide derivatives, alkylsulfonates, phosphoric acid derivatives, polyester derivatives, polyhydric alcohol esters, higher alcohol EO adducts, alkyl phenol EO adducts, acrylic acid esters and ethylene oxide derivatives.

The light-shielding plush having pile yarns may be processed with the anti-static agent at any stage in the production process of the plush, such as during the pile yarn production process, if the charging-preventative effect could be afforded to the plush having the pile yarns. However, for utmost effect, the plush is preferably processed during the ultimate step of production of the pile yarns. Among the illustrative processing methods, there are a method of immersing the light-shielding plush in a solution admixed with an anti-static agent and a method of uniformly spraying a solution admixed with an anti-static agent to the surface of the light-shielding plush, in particular to the pile surface.

For lubricants used for dyeing, any lubricants generally termed lubricants may unexceptionably be employed. Among these lubricants, there are, for example, long-chain alkyl sulfuric acid esters (such as dodecyl sodium sulfate or octadecyl sodium sulfate), long-chain fatty acid amides (such as N,N- diethyl stearic acid amide or behenic acid amide), fatty acid esters (such as methyl laurate, isotridecyl stearate or isobutyl oleinate), esters of polybasic acids (such as didecyl phthalate, tetraoctyl pyromellitate or triisodecyl trimellitate), fatty acid esters of polyhydric alcohols (such as sorbitan monolaurate, sorbitan monostearate, polyoxyethylene sorbitan monostearate or polyethylene glycol distearate), fatty acid esters of glycerin (such as monoglyceride stearate, diglyceride stearate or triglyceride caprate), waxes, paraffin oils, long-chain α-betaine carboxylate (such as N-stearyl-N,N- dimethyl- α-betaine carboxylates), silicones, such as those produced by SHIN-ETSU KAGAKU KOGYO KK under the trade name of polon-mr, -MG, -MF-2A, -MF-6, -MWS, -MY, -MK or -206, or those produced by KYOEISHA YUSHI KAGAKU KOGYO KK under the trade name of light silicone M-505, -M-702 or -No-75, colloidal silicas, such as those produced by NISSAN KAGAKU KOGYO KK under the trade name of snowtex 20, -30, -40, -C, -N, -0, -S, -20L or OL, colloidal solutions of alumina hydrates (boehmite type), such as alumina sols produced by NISSAN KAGAKU KOGYO KK, or the lubricants described in JP-patent Kokoku JP-B-46-27428, JP Patent Kokoku JP-B-53-292 or in U.S. Pat. No. 3042522.

For processing the light-shielding plush having pile yarns with the aid of the above lubricant, the lubricant may be dissolved or dispersed in a solvent, such as water, alcohols (such as methanol or ethanol), ketones (such as acetones) or esters (ethyl acetate) to a suitable concentration to provide a solution or a dispersion of the lubricant and to diffuse the solution by spraying or the like means onto the pile surface of the light-shielding plush. In such case, only the pile surface side of the light-shielding plush may be immersed in or coated with the lubricant solution. This processing may be performed before or after bonding the light-shielding plush having the pile yarns on a main body portion of the photographic film patrone.

The light-shielding plush bonded to the port portion is explained. It is of course essential for the light-shielding plush to have the light-shielding properties to assure light shielding within the container. In addition, it is required of the light-shielding plush to exhibit flexibility so as not to damage the web-shaped photographic photosensitive material during pull-out or rewind thereof, to exhibit pile dropout, to prevent yarn fluffs from becoming deposited on the surface of the web-shaped photosensitive material, and to exhibit pile orientation such as not to cause meandering of the running web-shaped photosensitive material. If these conditions are met, the light-shielding plush may be formed of any material, while it may be worked and arranged in any desired manner. However, the following light-shielding plush may be contemplated.

Such exemplary light-shielding plush is formed by a basic fabric of a knitted or woven texture, integrally with which are provided with 90 to 20% of colored looped piles and 10 to 80% of fluffy piles prepared by opening the colored looped piles. The light-shielding piles are made up of the loop-shaped piles and the fluffy piles. The looped piles present loops, while the fluffy piles are formed by shearing (opening) the looped pile. These piles are preferably colored with a black dye and a blue dye for assuring light-shielding performance.

The looped piles and the fluffy piles account for 90 to 20% and 10 to 80% of the piles, respectively. For preventing entanglement on the cut surface or waste pile yarns produced at the time of shearing, the loops are preferably formed entirely by looped piles. However, the looped piles are inferior to the opened fluffy piles in flexibility and light-shielding performance of the plush surface. In addition, the looped piles tend to warp the light-shielding plush in a pre-set direction, so that the web-shaped photographic photosensitive material tends to meander or be grazed when pulled out or taken up via the port opening.

It is therefore preferred to mix the looped piles and the fluffy piles in various proportions within the above-mentioned ranges depending on, for example, the sorts of the web-shaped photosensitive material. It is also preferred for the looped piles and the fluffy piles to be arrayed on the light-shielding plush in a homogeneous state depending on the mixing ratio. For preventing accidental pile dropout and for improving flexibility and light-shielding performance, it is preferred for the fluffy piles to be taller than the looped piles, so that the fluffy piles are disposed on the surface of the light-shielding plush, while both the fluffy piles and the looped piles are present in the mid to lower height portions of the plush, with the overall piles being formed as "semi-cut piles".

While there are a number of methods for preparing such structure of the light-shielding plush, it is necessary to form looped piles on the surface of the knitted fabric or the woven fabric with any of these methods.

The first method of preparing the light-shielding plush having the looped piles is to raise the weft-knitted fabric, such as circular knitted or plain knitted fabrics, in the form of looped piles, or to raise the warp knitted fabrics, such as tricot knitted fabric, russel knitted fabric, double russel knitted fabric or Milanese knitted fabric to form a light-shielding plush. There is also a method of raising a fabric for preparing a light-shielding plush.

There is likewise a method for directly preparing a knitted fabric having looped piles without raising using a circular knitting machine or a circular pile knitting machine for hosiery. Typical of the circular knitting piles is a sinker pile (see the Seni Kogaku (Textile Engineering), a periodical issued by Senikikai Gakkai-Shi (Society of Textile Machinery), vol.33, No.7 (1980), pages 390 to 397). Most preferred are a light-shielding plush formed by sinker pile yarns, a light-shielding plush having loop-shaped piles, produced from fibers containing not less than 50% of black dyed fibers of polyester fibers, acrylic fibers and nylon fibers using a circular knitting machine, and a light-shielding plush having French pile yarns, produced by first forming a knitted fabric using a tricot warp knitting machine and by pulling out and raising a transversely extending yarn for producing loop-shaped piles. For producing a plush usable for light shielding, it is necessary to cut and shear 10 to 80% of the looped piles thus produced and to leave 90 to 20% as looped piles. The light-shielding plush may be heat-set, or a sealing adhesive may be impregnated in the base fabric for prohibiting the light-shielding plush from becoming deformed in shape.

The basic fabric and piles of the light-shielding plush may be enumerated by those formed by one or more fibers selected from among synthetic fibers, including polyamides, such as nylon 6,6, polyesters, such as polyethylene terephthalate, polyolefins, such as polyethylene, polyvinyl alcohols, polyvinylidene chloride, polyvinyl chloride, acrylic fibers, such as polyacrylonitrile, acrylamides or methacrylic amides, polyvinylidene cyanides, polyfluoroethylene or polyurethane; natural fibers, such as silk, cotton, wool, cellulose or cellulose esters; and regenerated fibers, such as rayon or acetate. Most preferred among these fibers are polyamide, such as nylon 6, nylon 6,6, acrylic fibers, such as polyacrylonitrile, acrylamides or methacrylic amides, polyesters, such as polyethylene terephthalate, regenerated fibers, such as cellulose or cellulose esters, e.g., rayon or acetate. The fibers for the basic fabric and the piles may be the same or different from each other.

The fibers used may be long fibers or short fibers. The short fibers mean those fibers whose length is limited and which are twisted in the spinning step for forming the yarn, such as cotton fibers. These yarns are termed spun yarns which are twisted to inhibit slipping between fibers by the resulting pressuring force to form yarns. The more the number of twists, the stronger becomes the yarn. However, an excessive number of twists leads to loss of bulkiness and snarling to cause troubles in the knitting machine. The number of twists is selected to suit to the usage, such as woven or knitted fabric. The product formed by the spun yarns is generally more bulky than long fibers and has peculiar feeling.

The long fiber denotes a continuous filament, such as silk of natural fibers or generic chemical fibers. A plurality of such continuous fibers may be bundled together. In distinction from the short fibers, the spun yarns are not passed through a spinning step but the directly woven or knitted to form a product directly or after twisting. These fabrics are relatively dense and not bulky if the strength is taken into account. Besides, the products present a smooth surface.

The pile height inclusive of the height of the basic cloth is 0.8 to 2.5 mm, preferably 1 to 2.3 mm, more preferably 1.2 to 2.1 mm and most preferably 1.4 to 1.9 mm. The thickness of the yarn used for the base cloth varies significantly with the number of piles per unit area or density of the basic cloth. Specifically, the thickness of the yarn used for the basic cloth may be arbitrarily set and is usually 30 to 250 deniers, preferably 40 to 200 deniers, more preferably 50 to 180 deniers and most preferably 60 to 150 deniers, while that of the yarns used for piles may likewise be arbitrarily set and is usually 30 to 250 deniers, preferably 40 to 200 deniers, more preferably 50 to 180 deniers and most preferably 60 to 150 deniers. The density of the filaments of the yarn used for piles is 20000 to 60000/cm$^2$, preferably 25000 to 50000/cm$^2$, more preferably 27000 to 47000/cm$^2$ and most preferably 29000 to 45000/cm$^2$. The Young modulus of the pile may be of an arbitrary value within a range set out in, for example, JP Patent Kokoku JP-A-555019.

For producing a light-shielding plush, it may be produced to a wider width of approximately 30 to 200 cm and subsequently cut to a width usable as a light-shielding plush. Alternatively, it may be cut to a medium width (a width 2 to 10 times the width used as the light-shielding plush) and subsequently cut to a width usable as a light-shielding plush. Alternatively, the light-shielding plush may also be fabricated to a width usable as the light-shielding plush from the outset. In the method of cutting from a plush of a medium width or a broad width to form a light-shielding plush, the cutting means may be those described in JP UM Kokoku JP-B-48-35790. Alternatively, any of known cutting means, such as ultrasonic cutter, laser cutter, heat cutter, razor or a high-pressure water stream, may be employed.

For bonding the light-shielding plush to a main body portion of a photographic patrone, the bonding methods disclosed in, for example, JP Patent Kokai JF-A-49-96049, JP-A-53-105219, JP-A-53-105220, JP-A-53-105221, JP-A-54-4932, J-PA-61-233738, may be used.

The metallic material used for the patrone main portion may be enumerated by, for example, iron or steel, zinc, aluminum, copper and alloys thereof. The metal surface may also be processed by, for example, a phosphate coating method, iron oxide coating method, chromate coating method, chromic acid based oxide film coating method, or a chromic acid diphosphoric acid coating method. The metal surface may be coated with a paint or an ink as described in JP Patent Kokai JP-A-60-26061, -60-26062, -60-26063 and -61-233738. The coating materials or inks may be enumerated by paints or inks formed of, for example, alkyd resins, amino-alkyd resins, vinyl resins, acrylic resins, epoxy resins, polyurethane resins, polyester resins, a variety of rust-proofing paints, water paints or cellulose derivatives. The paints or inks may be used in combination as described in JP Patent Kokai JP-A60-26061, -60-26062 and -60-26063. The main body portion of the photographic film patrone may also be formed of plastics.

It is possible to use sealants for preventing the piles from falling off from the basic cloth and for preventing the adhesive from becoming permeated to the piles. The sealants that may be used in the present invention include one or more blends selected from among polyvinyls, polyolefins, polyurethanes, polyamides, polyesters, synthetic rubbers, epoxy resins, phenolic resins, emulsions of synthetic resins other than those given above, and an emulsion of copolymers composed of the above resins in various combinations.

The adhesive used for bonding the light-shielding plush having pile yarns and the main body portion of the photographic film patrone to each other may be enumerated by polyolefins such as polyethylene; vinyl acetate copolymers such as ethylene-vinyl acetate copolymers; acrylic acid ester copolymers such as ethylene-ethyl acrylate or ethylene-isobutylacrylate acetate copolymers; polyamides such as nylon 6, nylon 6,6, nylon 10, nylon 12 or N-nylon methoxymetylate; polyesters such as terephthalates; polyvinyl butyral; polyvinyl acetates; cellulose derivatives such as acetates, methyl cellulose or acetate butyrate; polymethacrylates such as polymethyl methacrylate; polyvinyl esters such as polyvinyl methyl ether; polyurethanes; polycarbonates, styrenic block copolymers such as styrene-ethylene-butylene-styrene; synthetic rubbers such as styrene butadiene, isoprene or butyl rubber; special rubbers not belonging to the synthetic rubbers; and acrylic copolymers not belonging to the above compounds. The adhesives may be used alone or in combination.

The woven fabric and the knitted fabric, making up the texture of the light-shielding plush, are now explained. The knitted fabric is highly extendable so that the slightest tension applied during processing detracts from the feeling after preparation and hence the desired dimension or density cannot be realized. This is caused by movements of the yarn of the loop against friction between yarns. Although the non-tension process is desirable, it is practically infeasible. Thus it is desirable to reduce the tension applied to the knitted fabric or to pass the fabric through a contractor during the ultimate finishing process.

If a knitted product is produced by a circular knitting machine, it may occasionally be handled as such. If the fabric is a printed article or prepared from crimped yarns of a synthetic material, the cloth in the form of a roll is usually opened and processed in this state. At this time, the opened roll material tends to be again rolled back to obstruct the operation. The tricot warp knitted goods also tend to roll back at the selvedge portions. In order to prevent this, a gumming agent may be applied to the selvedges. If the knitted goods are processed in the from of a roll, precautions need to be exercised for eliminating creases that might be produced during processing.

The woven fabric is harder and more tough than the knitted goods. The processed yarn used in a woven cloth is higher in elongation and needs to be treated in the same way as the knitted goods. However, other yarns are usually processed by a continuous system. With the continuous system, longitudinal tension tends to be produced. However, the woven cloth is susceptible to tension to a lesser extent than the knitted cloth. Such elongation in the longitudinal direction, if small, can be coped with by tenter overfeed or the ultimate sanforizing step. Although any of the woven cloth or a knitted cloth may be used for the light-shielding plush, the knitted goods are preferred for improving productivity and reducing the cost.

The container for the web-shaped photosensitive material according to the present invention may be used as a light-shielding container for accommodating a variety of web-shaped photosensitive materials, such as a photographic film patrone, color photographic film, film and photographic paper for computerized photocomposition, film for photomechanical process, photographic paper for auto positive color, full-color heat-sensitive paper, or a photosensitive resin film. Effect of the Invention By coloring the light-shielding plush with a colored dye (or dyes) exhibiting spectral absorption in a region of spectral sensitivity at least in the R-layer of the web-shaped photographic photosensitive material, the plush may be improved in the light-shielding properties. If the light-shielding plush is dyed with a colored dye exhibiting spectral absorption (SQ value) in the region of the spectral sensitivity not only for the R-layer but also for that of the B-layer, the plush may be further improved in light-shielding properties. More specifically, the light-shielding properties may be improved by coloring the light-shielding plush with the black dye and the blue dye. That is, while the black dye has so far been thought to have the maximum light-shielding performance, the light-shielding properties may be further improved by simply substituting the blue dye, for example, for part of the black dye. The light-shielding effect is outstanding in case the web-shaped photographic photosensitive material has sensitizing dyes in the B-layer and/or in the R-layer, in particular if the material is a color negative photographic film having ISO sensitivity of not less than 400.

The following effect may be produced by the means of the embodiments. Specifically, a light-shielding plush employing a double raschel knitted fabric is superior in productivity and low in cost. Moreover, since the pile yarns are inclined or filted in the film pull-out direction upon cutting and shearing the knitted cloth at a mid portion, the light-shielding performance may be improved further. In addition, the pull-out torque may be decreased while the photosensitive material is less susceptible to scratches.

It should be understood that modifications obvious in the art can be incorporated without departing from the gist and scope of the present invention as disclosed herein and defined in the appended claims.

What is claimed is:

1. A container for a web-shaped photographic photosensitive material comprising a core around which is wrapped a web-shaped photographic photosensitive material, a draw-out opening through which the photosensitive material is drawn out, and a light-shielding member provided in said draw-out opening;

wherein said light-shielding member is dyed with at least one coloring dye having spectral absorption in a spectral sensitivity region of at least a red-sensitive layer of said web-shaped photographic photosensitive material.

2. The container as defined in claim 1, wherein said light-shielding member is dyed with at least one coloring dye having spectral absorption in the spectral sensitivity regions of a blue-sensitive layer and the red-sensitive layer of said web-shaped photographic photosensitive material.

3. The container as defined in claim 1, wherein said light-shielding member is dyed with at least one dye selected from a group of bluish dyes consisting of a blue dye, violet dye and green dye and with a black dye.

4. The container as defined in claim 3, wherein said black dye is present in a weight ratio of the black dye in said coloring dyes to said bluish dyes of 50-98:50-2.

5. The container as defined in claim 4 wherein said weight ratio is 80-90:20-10.

6. The container as defined in claim 1, wherein said web-shaped photographic photosensitive material is a color negative photographic film with an ISO sensitivity of not less than 400.

7. The container as defined in claim 1 wherein said light-shielding member is selected from a group consisting of plush, planted wool, unwoven fabric, sponge and paper.

8. The container as defined in claim 1 wherein said spectral absorption is at least 400 nm.

9. A container for a photosensitive material comprising a draw-out opening through which the photosensitive material is drawn out, and a light-shielding member provided in said draw-out opening;

wherein said light-shielding member is dyed with at least one coloring dye having spectral absorption in a spectral sensitivity region of at least a red-sensitive sensitizing dye contained in said photosensitive material.

10. The container as defined in claim 9, wherein said light-shielding member is dyed with at least one coloring dye having spectral absorption in the spectral sensitivity regions of a blue-sensitive sensitizing dye and the red-sensitive sensitizing dye contained in said photosensitive material.

11. The container as defined in claim 9 wherein said light-shielding member is dyed with at least one dye selected from the group of bluish dyes consisting of a blue dye, a violet dye and a green dye and with a black dye.

12. The container as defined in claim 11 wherein said black dye is present in a weight ratio of the black dye in said coloring dyes to said bluish dyes of 50-98:50-2.

13. The container as defined in claim 12 wherein said weight ratio is 80-90:20-10.

14. The container as defined in claim 9 wherein said photosensitive material has an ISO sensitivity of not less than 400.

15. The container as defined in claim 9 wherein said light-shielding member is selected from a group consisting of plush, planted wool, unwoven fabric, sponge and paper.

16. The container as defined in claim 9 wherein said spectral absorption is at least 400 nm.

17. A light shielding member which is dyed with least one coloring dye having spectral absorption in a spectral sensitivity region of at least one of a red-sensitive layer and red-sensitive sensitizing dye of a photosensitive material.

18. The light shielding member as defined in claim 17 wherein said spectral absorption has a value specific blue and red.

19. The light shielding member as defined in claim 17 wherein said spectral absorption is set to substantially inhibit light fog caused by sunlight entering through a contact interface of the light shielding member with a photosensitive material.

* * * * *